*INVENTOR.*
RICHARD N. DOBSON
HOWARD J. BEXON

BY Church & Rogers

PATENT AGENTS

United States Patent Office 3,508,764
Patented Apr. 28, 1970

3,508,764
LOAD RESTRAINING SYSTEM FOR VEHICLES
Richard N. Dobson, Burlington, Ontario, and Howard J. Bexon, Oakville, Ontario, Canada, assignors to Dominion Foundries and Steel Limited, Hamilton, Ontario, Canada
Filed Oct. 11, 1968, Ser. No. 766,705
Int. Cl. B60p 7/10
U.S. Cl. 280—179                10 Claims

ABSTRACT OF THE DISCLOSURE

In a load-restraining system for metal-floored vehicles one or more wedge-shaped skid runners are fastened by metal straps to the underside of the load, and the metal floor is provided with longitudinal grooves of complementary shape in which the skid runners engage; the arrangement provides a high-friction restraint permitting the load to move along the floor without damage under impact applied to the vehicle without requiring positive fastening of the load to the vehicle.

FIELD OF THE INVENTION

This invention is concerned with improvements in or relating to load restraining systems for use in vehicles, and especially but not exclusively to such systems for use with railway vehicles having floors essentially of steel.

DESCRIPTION OF THE PRIOR ART

The shipping of loads in vehicles, and particularly railway vehicles, frequently presents problems in restraining the load so that it will not be damage by the impacts to which the vehicle is inevitably subjected in ordinary use. One solution is of course to fasten the load so securely that it is immovable under any applied impact but this is usually difficult and expensive.

Another arrangement that has been used, particularly in the shipping of bundles of steel sheets, is to fasten each bundle to a pair of wooden skids by steel straps running longitudinally of the skids, and mount the resultant package on the car floor between a set of guide rails running the length of the car. The load is therefore held against transverse movement, but is in a "floating" condition longitudinally of the car. The impacts applied to the car are almost always endwise in direction, and they simply cause the load to skid along the floor on steel straps a corresponding distance without damage to the bundle.

This "floating" concept has also been applied to the shipping of coils of steel, the longitudinal rails forming a trough in which the coils are placed so that they are free to move longitudinally of the car. The system is found to be quite practicable, and is considerably less expensive than rendering the load immovable.

The longitudinal rails are usually fastened to the car floor by nailing, and for this purpose it has previously been a requirement for railroad car floors that it be possible to nail material thereto. Consequently, the types of floor used hitherto have been all wood, or a combination of steel channels with wooden inserts, or the all-steel so-called "nailable" type. Floors of any type that employ wood give satisfactory performance with said "floating" concept, because of the relatively high friction between the wood and the steel straps, but are expensive to maintain because of the need to replace the wooden members. An all steel floor is therefore preferred, but the floors known hitherto are not suited to the "floating" load system, since the friction between the metal skid straps and the steel floor is too low, causing the load to engage the car end with the possibility of mutual damage to both.

SUMMARY OF THE INVENTION

It is an object of the present invention to provide a new load restraining system use in vehicles.

It is a particular object to provide a new load restraining system especially suitable for use in railway vehicles having steel floors.

In accordance with the present invention there is provided a load restraining system for use in metal-floored vehicles characterised by the vehicle comprising a metal floor having at least one floor groove or floor ridge extending longitudinally of the vehicle parallel to the general direction of travel thereof, and by the load comprising at its underside at least one skid runner respectively having a skid ridge engaged in the corresponding floor groove or having a skid groove in which the corresponding floor ridge is engaged, each said ridge being of less depth than the corresponding groove in which it is engaged and being of tapered cross section decreasing from its base toward its apex, each groove being of tapered cross section complementary to that of the corresponding ridge so that the side walls of the ridge are frictionally engaged at least by the weight of the load with the corresponding groove side walls to restrain by said frictional engagement longitudinal movement of the ridge in the groove.

DESCRIPTION OF THE DRAWINGS

A load restraining system which is a particular preferred example of the present invention will now be described by way of example, with reference to the accompanying drawings, wherein.

DESCRIPTION OF THE PREFERRED EMBODIMENTS

Figure 1:
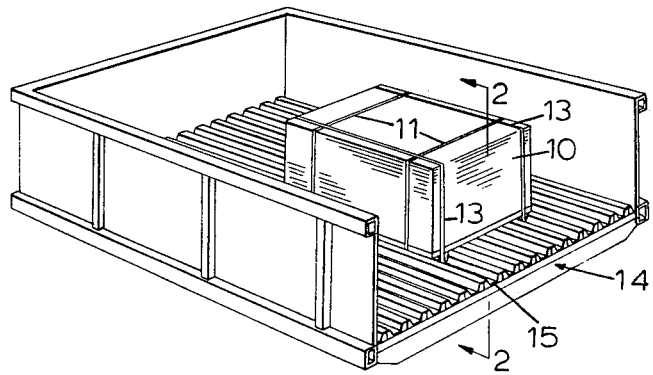
FIGURE 1 is a perspective view from above showing the application of the system to a steel-floored railway vehicle.

The particular load illustrated herein comprises a vertically-stacked bundle 10 of flat steel sheets fastened together by two transverse steel straps 11. The bundle is mounted upon two parallel transversely-spaced, longitudinally extending wooden skid runners 12, ussually of a hard wood such as maple, which are fastened to the bundle by means of respective tensioned steel straps 13 passing completely around the bundle and also around the skids; for additional security these steel straps may be fastened to the skids, e.g., by nailing. The car floor 14 on which the load is mounted consists of one or more longitudinally grooved members 15, disposed with the grooves 16 parallel to the general direction of travel of the car, the spacing between the grooves being such that each skid runner is engaged in a corresponding one of the longitudinal floor grooves 16.

Figure 2:
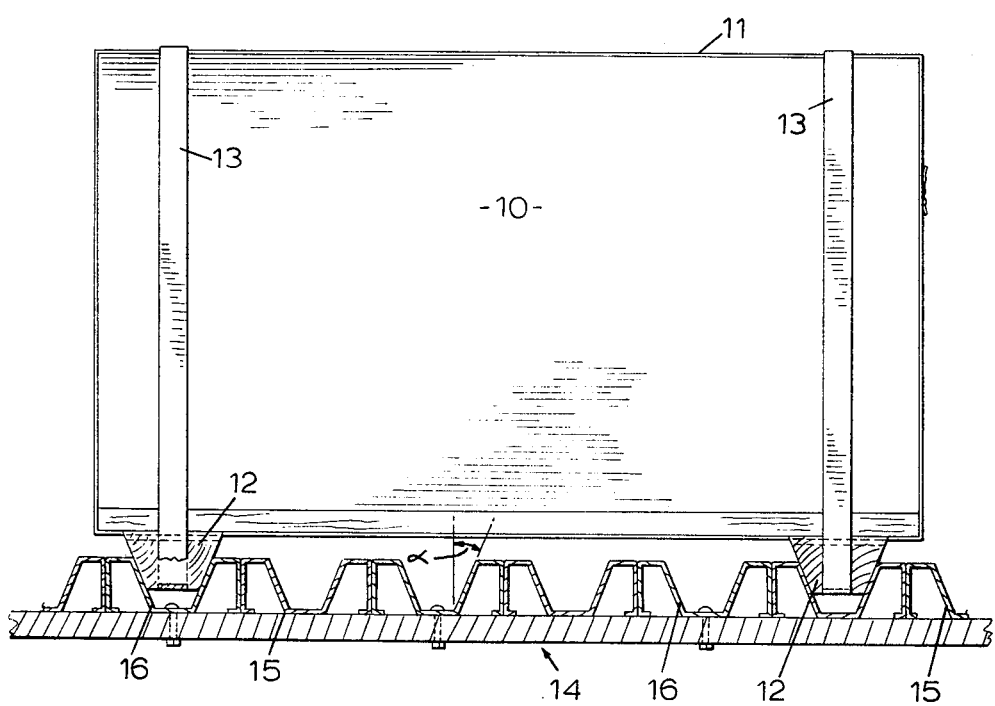
FIGURE 2 is a section taken on the line 2—2 of FIGURE 1.

Referring now especially to FIGURE 2, it will be seen that each floor groove is of tapered cross section, decreasing in width downwardly from the base to the apex, and each skid runner ridge is also of tapered, downwardly-decreasing width from its base to its apex, complementary to said groove, so that the inclined side walls of the skid runner ridge are parallel to and frictionally engaged with the corresponding floor groove side walls. The depth of the skid runner ridge engaged in the groove is less than the depth of the groove, so that the steel strap 13 is accommodated in the space between the bottom of the runner and the bottom of the groove, and cannot engage the steel floor to provide a corresponding metal-to-metal contact of low friction coefficient.

In the operation of the system one or more skid runners are fastened to the underside of the load in the manner described above, and the load is then simply placed in the car, approximately midway of its length. An examination of such a load, using high speed photography, shows that upon impact the package of load and attached skid runners jumps upward slightly in the grooves, and then falls back into the grooves. This action is quite pronounced and is believed to be beneficial in that the skid runners thereby wedge themselves solidly into the grooves. Analysis of the extent of movement of the load under impact shows that the friction coefficient between the runner and the grooves is substantially higher than a corresponding metal-to-wood engagment between flat surfaces, and highly satisfactory load restraint is achieved. The depth to which the skid runner ridges protrude into the floor grooves should of course be sufficient to ensure that the runners cannot jump completely out of the grooves under the impacts encountered in ordinary service.

It is found in practice that there is an optimum value for the angle $\alpha$, which is the angle of inclination to the vertical of the frictionally-engaging surfaces; the preferred range for this angle is approximately 20° to approximately 30°. It will be understood by those skilled in the art that the cooperating combination is arranged to provide the required high friction force, preferably approximately twice that obtained between two flat surfaces, one wood and one steel.

Figure 3:
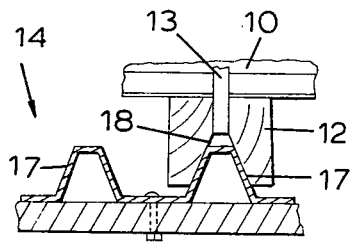
FIGURE 3 is a partial section similar to FIGURE 2 of another embodiment.

In an alternative embodiment illustrated by FIGURE 3, the car floor members 15 are provided with spaced parallel ridges, such as 17, in place of the grooves of the previous embodiment, the floor ridges cooperating with corresponding runner grooves 18. The ridge illustrated is also of tapered cross section, decreasing from its base toward its apex, with the side faces at an angle $\alpha$ to the vertical, while the runner groove is of complementary cross section and greater depth.

It will of course be appreciated that other combinations and arrangements are possible within the scope of the invention. For example, more than two skid runners may be employed for a particularly wide and/or heavy load; the length of the runners can be such that more than one load member can be mounted thereon spaced from one another. Other forms of load may of course require other means for mounting it on the skid runners, and for example, in the case of coils of steel, each coil could rest upon two immediately adjacent runners, relative movement between the coil and the runners being prevented by transverse end bars.

In the particular embodiment illustrated the entire car floor is provided by the longitudinally grooved floor members 15, but in other constructions a combination of different kinds of floor members can be employed, for example longitudinally grooved members in accordance with the invention may be interspersed with one of the known nailable steel members.

What we claim is:

1. Load restraining system for use in metal-floored vehicles, the system being capable of preventing movement of an unsecured load resting on the vehicle floor upon the application thereto of an impact force operative in one of the usual two opposite directions of travel of the vehicle and of less than a predetermined magnitude, and permitting restrained movement of the load along the floor in the respective usual direction of travel upon the application thereto of said impact force of greater than said predetermined magnitude so as to at least reduce the deleterious effect of such an impact force upon the load, wherein the vehicle floor comprises at least one grooved floor member disposed with the groove or grooves extending longitudinally of the vehicle parallel to the said usual directions of travel thereof, at least one of said grooves being of tapered transverse cross section that decreases in width downwards, wherein the load is mounted upon at least one skid runner having at least one skid ridge, which ridge is engaged in a cooperating tapered floor groove, each skid ridge being of tapered cross section complementary to that of the cooperating groove whereby the side walls of the ridge are frictionally engaged with the corresponding groove side walls to restrain solely by said frictional engagement longitudinal movement in the vehicle of the skid and the load mounted thereon.

2. A system as claimed in claim 1, wherein each skid runner is of wood.

3. A system as claimed in claim 1, wherein the angle to the vertical of the frictionally engaged side surfaces of each groove and its cooperating ridge is between 20° and 45°.

4. A system as claimed in claim 3, wherein the said angle to the vertical is 30°.

5. A system as claimed in claim 1, wherein each skid runner is fastened to the load by a respective tensioned longitudinally-extending metal strap passing around the load and the runner through a respective space between the immediately adjacent apices of the ridge and its cooperating groove.

6. Load restraining system for use in metal-floor vehicles, the system being capable of preventing movement of an unsecured load resting on the vehicle floor upon the application thereto of an impact force operative in one of the usual two opposite directions of travel of the vehicle and of less than a predetermined magnitude, and permitting restrained movement of the load along the floor in the respective usual direction of travel upon the application thereto of said impact force of greater than said predetermined magnitude so as to at least reduce the deleterious effect of such an impact force upon the load, wherein the vehicle floor comprises at least one ridged floor member disposed with the ridge or ridges extending longitudinally of the vehicle parallel to the said usual directions of travel thereof, at least one of said ridges being of tapered transverse cross section that increases in width downwards, wherein the load is mounted upon at least one skid runner having at least one skid groove in which a cooperating tapered floor ridge is engaged, each skid groove being of tapered cross section complementary to that of the cooperating ridge whereby the side walls of the ridge are frictionally engaged with the corresponding groove side walls to restrain solely by said frictional engagement longitudinal movement in the vehicle of the skid and the load mounted thereon.

7. A system as claimed in claim 6, wherein each skid runner is of wood.

8. A system as claimed in claim 6, wherein the angle to the vertical of the frictionally engaged side surfaces of each groove and its cooperating ridge is between 20° and 45°.

9. A system as claimed in claim 8, wherein the said angle to the vertical is 30°.

10. A system as claimed in claim 6, wherein each skid runner is fastened to the load by a respective tensioned longitudinally extending metal strap passing around the load and the runner through a respective space between the immediately adjacent apices of the ridge and its cooperating groove.

References Cited

UNITED STATES PATENTS

| | | | |
|---|---|---|---|
| 1,403,568 | 1/1922 | Rodowicz | 105—366 |
| 2,478,578 | 8/1949 | Gottshall. | |

LEO FRIAGLIA, Primary Examiner

R. R. SONG, Assistant Examiner

U.S. Cl. X.R.

296—35